United States Patent
Rockwell

(10) Patent No.: US 6,204,992 B1
(45) Date of Patent: Mar. 20, 2001

(54) DATA CARTRIDGE LOADING AND UNLOADING APPARATUS AND METHOD OF USE

(75) Inventor: Scott M. Rockwell, Aurora, CO (US)

(73) Assignee: Advanced Digital Information Corporation, Redmond, WA (US)

(*) Notice: Subject to any disclaimer, the term of this patent is extended or adjusted under 35 U.S.C. 154(b) by 0 days.

(21) Appl. No.: 09/096,280

(22) Filed: Jun. 11, 1998

(51) Int. Cl.[7] .................................................. G11B 33/00
(52) U.S. Cl. ............................................. 360/92; 369/178
(58) Field of Search ............................. 360/92; 369/178, 369/36, 191, 192

(56) References Cited

U.S. PATENT DOCUMENTS

| | | | |
|---|---|---|---|
| 2,523,786 | 9/1950 | Soreng | 200/69 |
| 2,855,472 | 10/1958 | Schwarzenbach et al. | 200/6 |
| 3,142,198 | 7/1964 | Williams | 74/483 |
| 3,899,794 | 8/1975 | Brown, Jr. | 360/133 |
| 4,142,730 | 3/1979 | Hynd et al. | 274/9 B |
| 4,177,363 | 12/1979 | Keranen | 200/5 B |
| 4,415,940 | 11/1983 | Becker | 360/99 |
| 4,539,860 | 9/1985 | Johnston et al. | 4/483 PB |
| 4,570,195 | 2/1986 | Shimaoka et al. | 360/97 |
| 4,685,011 | 8/1987 | Shimaoka et al. | 360/97 |
| 4,688,125 | 8/1987 | Nomoto et al. | 360/99 |
| 4,710,829 | 12/1987 | Shimaoka et al. | 360/97 |
| 4,723,185 | 2/1988 | Maeda | 360/97 |
| 4,870,518 | 9/1989 | Thompson et al. | 360/97.01 |
| 4,965,685 | 10/1990 | Thompson et al. | 360/97.01 |
| 5,045,647 | 9/1991 | Kato | 200/5 E |
| 5,561,653 | 10/1996 | Liou et al. | 369/77.1 |
| 5,610,892 | 3/1997 | Choi | 369/77.2 |
| 5,687,039 | * 11/1997 | Coffin et al. | 360/92 |
| 5,774,301 | * 6/1998 | Manes et al. | 360/92 |
| 5,870,245 | * 2/1999 | Kersey et al. | 360/92 |

* cited by examiner

Primary Examiner—William R. Korzuch
(74) Attorney, Agent, or Firm—Seed IP Law Group, PLLC

(57) ABSTRACT

A system and method for loading and unloading a data cartridge includes a data cartridge processor having a loader tray for loading and unloading a data cartridge into and from the data cartridge processor. The data cartridge processor records data to or receives data from the data cartridge. A cartridge loader is provided for actuating the loader tray to lower the data cartridge or raise the loader tray to unload the data cartridge into and from the data cartridge processor. An accessor is provided for activating the cartridge loader driven by an actuator for effecting movement of the accessor.

20 Claims, 2 Drawing Sheets

DATA CARTRIDGE LOADING AND UNLOADING APPARATUS AND METHOD OF USE

TECHNICAL FIELD OF THE INVENTION

The present invention relates generally to mass data storage libraries and, more particularly, to a system and method for loading and unloading a data cartridge in a read/write data processor.

BACKGROUND OF THE INVENTION

Mass data storage libraries are used to store and retrieve data quickly and efficiently. An example of a mass data storage library includes data records or cartridges for storing data, data cartridge processors for recording data to or reading data from the data cartridges, a storage rack or library for holding or storing the data cartridges, and an accessor or transport mechanism for transporting the data cartridges between the storage rack and the data cartridge processors. The data cartridges may include different types or recording media such as cassettes, floppy disks, diskettes, optical disks, compact disks and the like. Additionally, the accessor is used to insert the data cartridges into or remove the data cartridges from the data cartridge processors and the storage rack.

Data cartridge processors are available in a variety of configurations. For example, one type of data cartridge processor includes a clutch that engages the data cartridge for recording data to or reading data from the data cartridge. The data cartridge processor is equipped with an external mechanism for actuating the clutch for engaging and disengaging the data cartridge with the data cartridge processor, such as a handle or a motor.

Using data cartridge processors in an automated mass data storage library, however, suffers several disadvantages. For example, the accessor or transport mechanism may be unable to access or may be incapable of operating the external mechanism for engaging or disengaging the data cartridge. Alternatively, manually engaging or disengaging the data cartridge with the data cartridge processor is inefficient, especially in large mass data storage libraries. Additionally, motors for engaging or disengaging the data cartridge with the data cartridge processor require secondary control circuitry for operating the motors at selected times, thereby affecting reliability of the mass data storage library. Motors and secondary control circuitry also increases costs associated with the mass data storage library.

SUMMARY OF THE INVENTION

Accordingly, a need has arisen for an improved method for loading and unloading a data cartridge in a read/write data processor.

In accordance with the present invention, a system and method for loading and unloading a data cartridge in a read/write data processor are provided that address disadvantages and problems associated with prior art systems and methods. According to one embodiment of the present invention, a system for loading and unloading a data cartridge comprises a data cartridge processor having a coupler for engaging or disengaging with a data cartridge. The data cartridge processor is operable to record data to or read data from the data cartridge. A cartridge loader is provided for activating the coupler to engage or disengage the data cartridge with the data cartridge processor. The system also comprises an accessor for activating the cartridge loader and an actuator for effecting movement of the accessor.

According to another embodiment of the invention, a method for loading and unloading a data cartridge in a read/write data processing system comprising a data cartridge processor having an opening and a coupler for engaging or disengaging a data cartridge with the data cartridge processor is provided. The data cartridge processor is operable to record data to or read data from the data cartridge. The method comprises inserting or removing the data cartridge into or from the opening in the data cartridge processor with an accessor, and actuating a cartridge loader with the accessor for engaging or disengaging the data cartridge with the data cartridge processor.

The invention provides several advantages. For example, the invention provides greater reliability than conventional systems. In one embodiment of the invention, a cartridge loader for activating a coupler to engage or disengage a data cartridge is provided and is activated by an accessor, thereby eliminating a requirement for a motor and associated motor secondary control circuitry for engaging and disengaging the data cartridge with the data cartridge processor. In the same embodiment, manually engaging or disengaging the data cartridge with the data cartridge processor remains available. Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 4 of the drawings, like numerals being used for like and corresponding parts of the various drawings.

Figure 1:
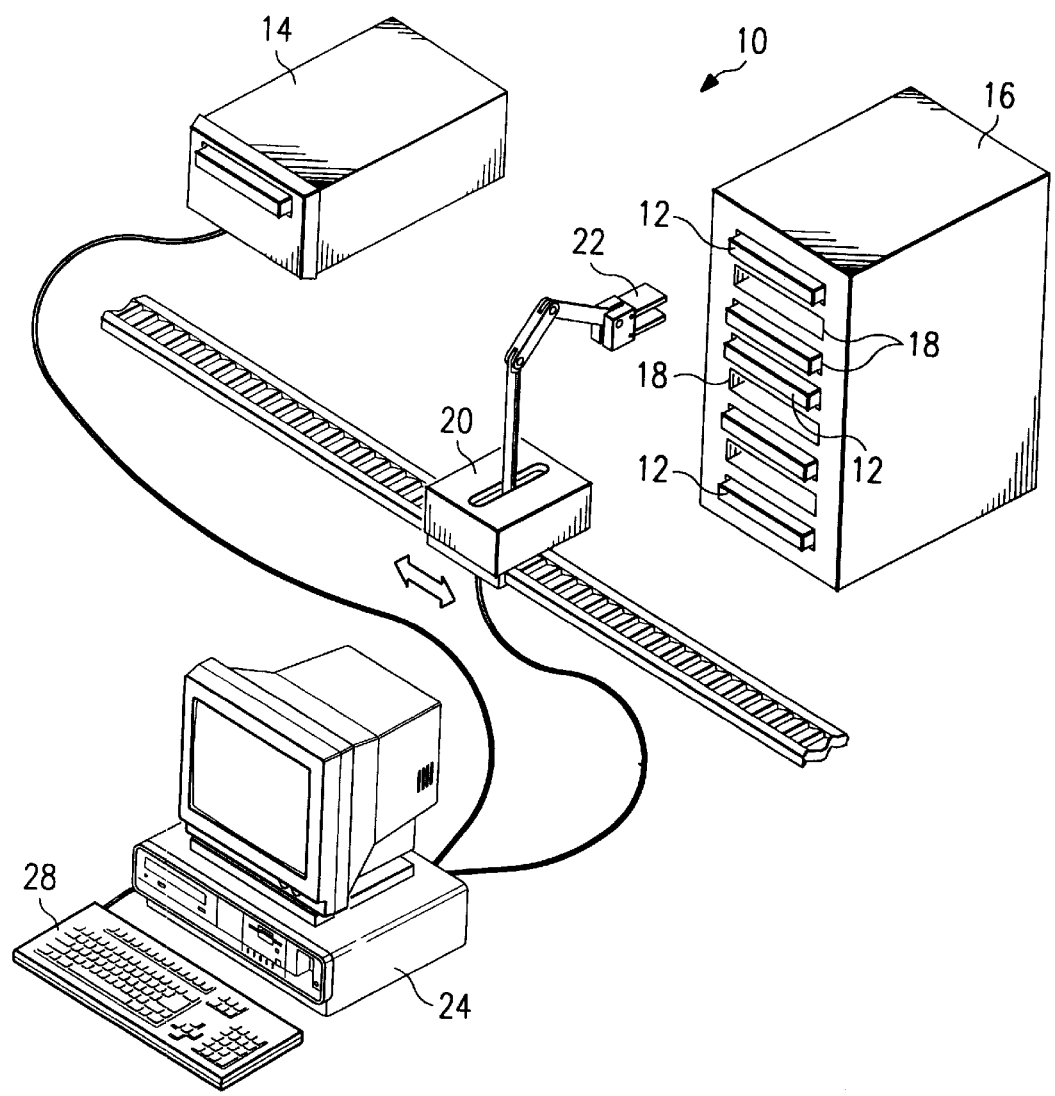
FIG. 1 is an isometric drawing of a system for loading and unloading a data cartridge in a read/write data processor in accordance with the present invention.

FIG. 1 illustrates an isometric view of a media handling system 10 for loading and unloading a data cartridge 12 into and from a data cartridge processor 14. The media handling system 10 includes a storage rack or library 16 having a plurality of storage trays or compartments 18 for holding or storing data cartridges 12. Data cartridges 12 may include different types of recording media such as cassettes, compact discs, optical discs, and the like. Additionally, multiple storage racks 16 may be included in the media handling system 10 to accommodate increased capacity requirements for stored data.

The media handling system 10 also includes an accessor 20 for transferring data cartridges 12 between the storage rack 16 and the data cartridge processor 14. In one embodiment of the invention, accessor 20 includes a robotic mechanism driven by an actuator for transferring data cartridges 12 between the storage rack 16 and the data cartridge processor 14. However, accessor 20 may include other suitable methods or devices for transferring data cartridges 12 from one location to another. The actuator optionally includes an electrically powered motor or other types of motors, such as air or hydraulically powered motors. In one embodiment of the invention, accessor 20 includes a gripper 22 for grasping or holding data cartridges 12. In operation, the gripper 22 functions to grasp and hold the data cartridge 12 for transporting between the storage rack 16 and the data cartridge processor 14.

Figure 2:
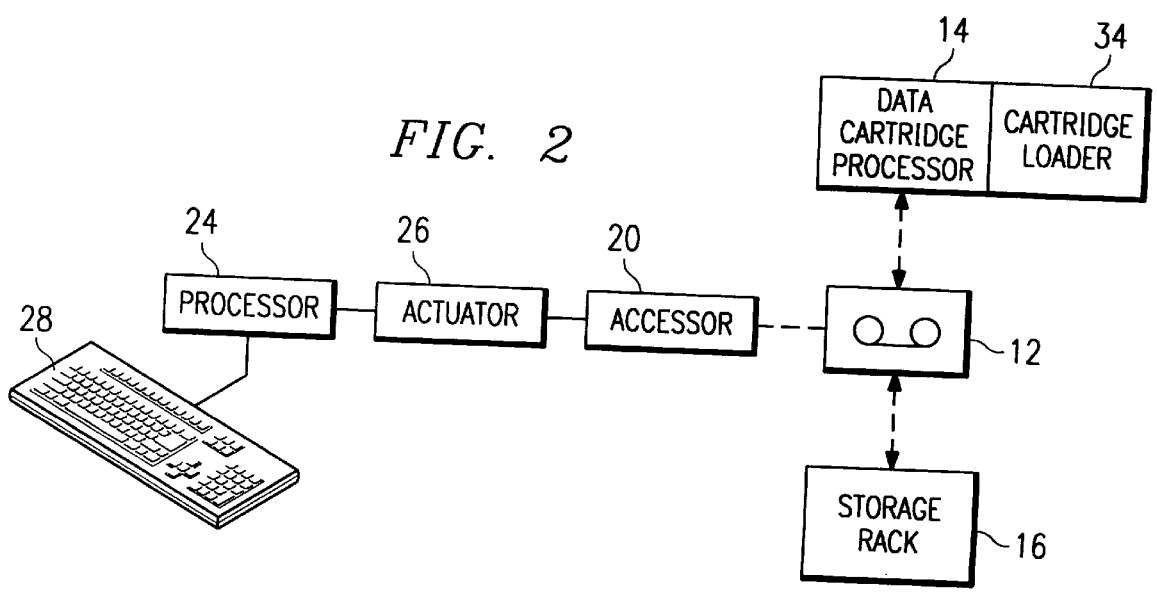
FIG. 2 is a block diagram of the system shown in FIG. 1.

Referring to FIG. 2, the media handling system 10 also includes a system controller 24 for controlling an actuator 26. The system controller 24 typically includes a processor (not shown) for receiving and responding to requests from an operator by means of an operator keyboard 28 to record data to or read data from data cartridges 12. For example, location information of particular compartments 18 or data cartridges 12 within storage rack 16 is entered or stored in the system controller 24 through the operator keyboard 28. Location information of a particular data cartridge processor 14 is also entered or stored in the system controller 24 through the operator keyboard 28. Other locating devices, such as optical sensor equipment (not shown), may also be associated with the system controller 24 for locating data cartridges 12, compartments 18 of the storage rack 16 and data cartridge processors 14 within the media handling system 10.

In operation, in response to an operator's request for information, the system controller 24 initiates operation of the actuator 26 to move the accessor 20 to the storage rack 16 for retrieving a designated data cartridge 12. The system controller 24 and actuator 26, using stored location information and/or other locating devices, moves the accessor 20 to the storage rack 16 to a designated compartment 18 or data cartridge 12. The accessor 20 and gripper 22 function to grasp the designated data cartridge 12 and transport the data cartridge 12 to the data cartridge processor 14.

Figure 3:
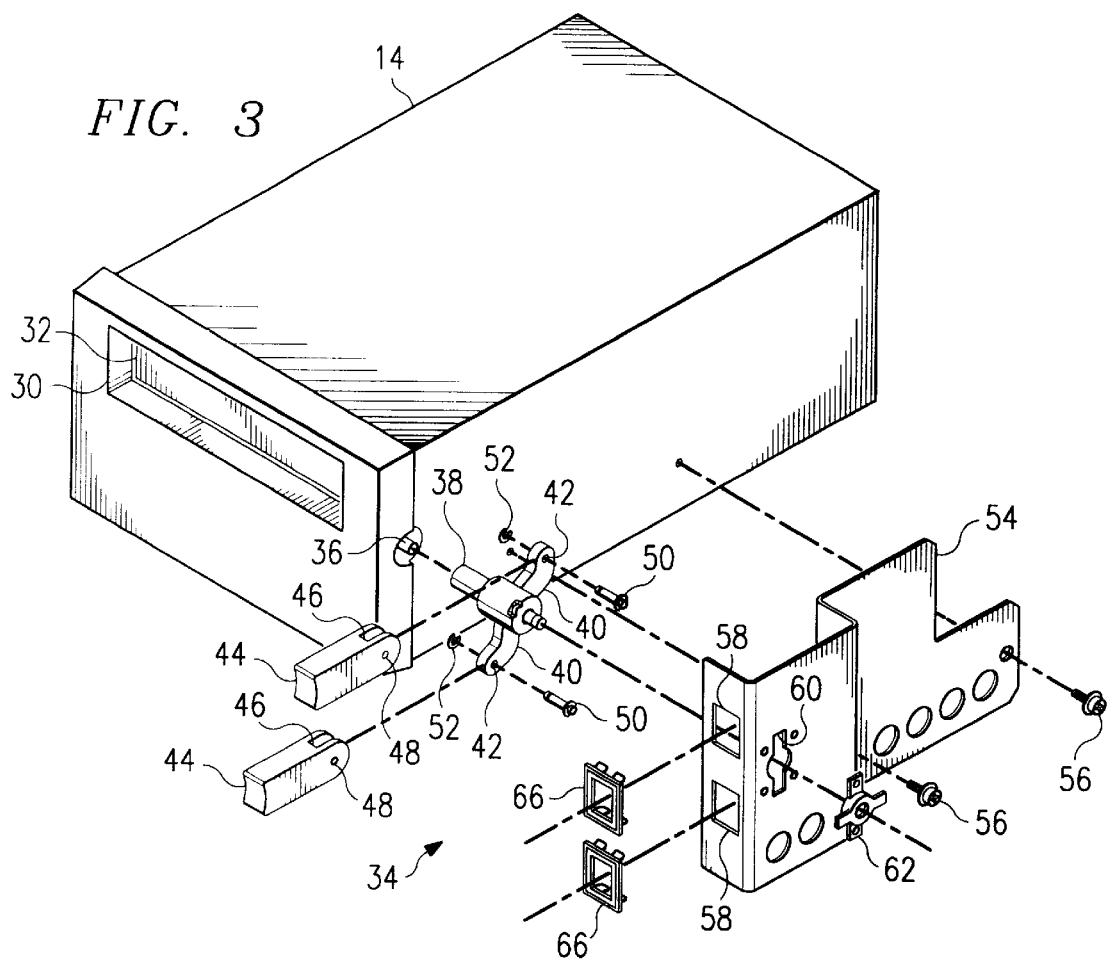
FIG. 3 is an exploded isometric drawing of a data cartridge processor in accordance with the present invention.

Referring to FIG. 3, there is illustrated an exploded isometric view of the data cartridge processor 14 incorporating the present invention. The data cartridge processor 14 includes an opening 30 for receiving data cartridges 12. In one embodiment of the invention, the data cartridge processor 14 includes a coupler 32 for engaging or disengaging the data cartridges 12 for recording data to or reading data from the data cartridges 12. In one embodiment, the coupler 32 includes a clutch; however, other suitable methods or devices may be used to engage or disengage the data cartridge 12 with the data cartridge processor 14. Additionally, examples of suitable data cartridge processors 14 include any of the DTLtape family of tape drive products manufactured by Quantum Corporation. Attached to the data cartridge processor 14 is a cartridge loader 34 for activating the coupler 32. The cartridge loader 34 includes a shaft 36 attached to the coupler 32 such that rotational movement of shaft 36 activates the coupler 32 to engage or disengage the data cartridge 12 with the data cartridge processor 14. As illustrated, the shaft 36 has a D-shaped configuration, although other suitable shapes and configurations are equivalents and perform the same function. A bell crank 38 is attached to the shaft 36 providing for leveraged rotation of the shaft 36 to activate the coupler 32. Preferably, the bell crank 38 has a generally hollow D-shaped configuration for slidably coupling to the D-shaped section of the shaft 36, although other suitable shapes or configurations are equivalents for attaching to the shaft 36.

As illustrated, bell crank 38 includes outwardly extending arms 40, each arm 40 having an opening 42. Also included in the cartridge loader 34 is a plurality of push buttons 44 pivotally attached to the extending arms 40 of the bell crank 38, each push button 44 having a slot 46 for receiving an arm 40. Additionally, each push button 44 includes an opening 48 disposed adjacent slot 46 and extending through the push button 44.

The push buttons 44 are attached to the arms 40 by pivot pins 50 inserted through the openings 48. The pivot pins 50 are secured in place by means of E-clips 52 or other suitable devices.

The cartridge loader 34 also includes a housing 54 attached to a side wall of the data cartridge processor 14 to enclose the bell crank 38 and push buttons 44. Threaded fasteners 56 attach the housing 54 to the data cartridge processor 14. A plurality of apertures 58 are formed in the housing 54 to receive the push buttons 44. Additionally, the housing 54 includes an opening 60 to receive outwardly extending bell crank 38. The bell crank 38 extends through the opening 60 and is secured in position with a bushing 62.

Push buttons 44 cooperate and extend through apertures 58 and the linear motion of the push buttons 44 are translated into rotational motion of the bell crank 38. Push button guides 66 are attached to the housing 54 to facilitate movement of the push buttons 44 within the apertures 58.

The operation of the above-described embodiment will now be briefly described. The system controller 24, in response to a request to record data to or read data from data cartridges 12, activates the actuator 26 to direct the accessor 20 to the storage rack 16. Using previously entered or stored location information of a designated data cartridge 12, the system controller 24 positions accessor 20 in front of the storage rack 16 in position to select the designated data cartridge 12 from the storage rack 16. After the accessor 20 is in the desired position, the gripper 22 (not shown) functions to grasp or hold the designated data cartridge 12 and to remove the data cartridge 12 from the storage rack 16.

After securing possession of a designated data cartridge 12, the system controller 24 directs the accessor 20 to transport the data cartridge 12 from the storage rack 16 to the data cartridge processor 14. As previously discussed, location information of the data cartridge processor 14 is entered or stored in the system controller 24 through the operator keyboard 28, or the system controller 24 may use other suitable methods or devices for locating a particular data cartridge processor 14.

When the data cartridge 12 has been positioned at the data cartridge processor 14, the gripper 22 inserts the data cartridge 12 into the opening 30. The accessor 20, using the gripper 22, activates the cartridge loader 34 by depressing one of the push buttons 44. When the accessor 20 depresses a push button 44, it moves inwardly thereby causing the bell crank 38 to rotate. Rotation of the bell crank 38 causes the shaft 36 to rotate resulting in activation of the coupler 32 to engage or disengage the data cartridge 12 with the data cartridge processor 14.

Figure 4:
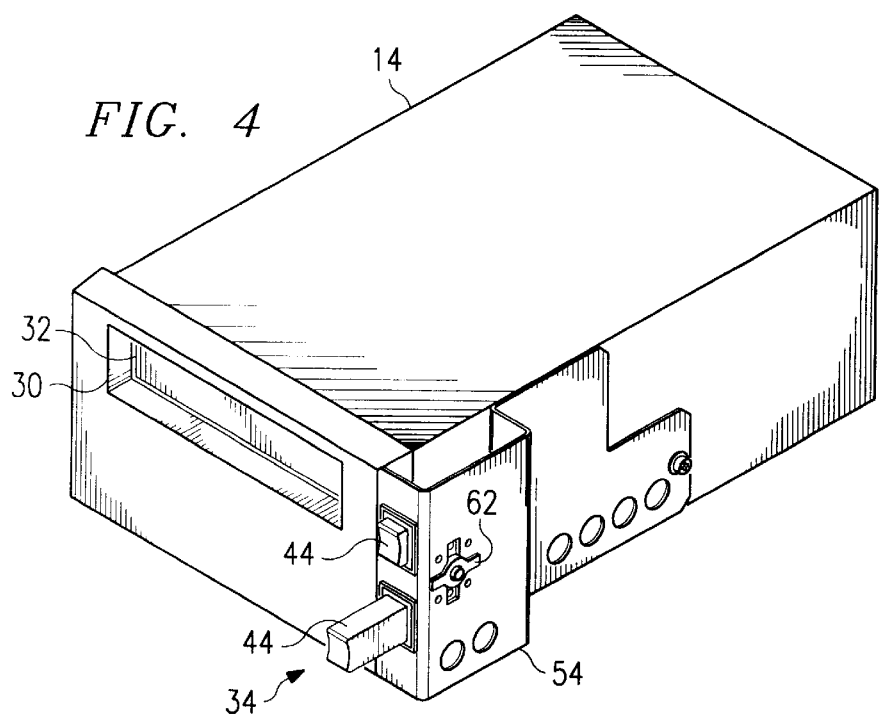
FIG. 4 is an isometric drawing of the data cartridge processor illustrated in FIG. 3.

As best shown in FIG. 4, operation of the bell crank 36 provides alternately projecting push buttons 44 extending outwardly from the housing 54. Therefore, actuation of one push button 44 results in engaging the data cartridge 12 and actuation of the other push button 44 results in disengaging the data cartridge 12. Additionally, location information applied to the opening 30 of the data cartridge processor 14 and cartridge loader 34 may be entered or stored in the system controller 24 to enable positioning of the gripper 22. Thus, the above-described embodiment of the invention provides an efficient media handling system 10 by providing automatic loading and unloading of data cartridges 12 into and from data cartridge processors 14.

Additionally, the described media handling system 10 provides greater flexibility than conventional systems by allowing manual loading and unloading of data cartridges 12 into and from data cartridge processor 14. For example, the push buttons 44 may be manually depressed to activate the coupler 32 to engage or disengage the data cartridge 12 with the data cartridge processor 14.

Although the present invention and its advantages have been described in detail, it should be understood that various changes, substitutions, and alterations can be made therein without departing from the spirit and scope of the present invention as defined by the appended claims.

What is claimed is:

1. An apparatus for loading and unloading a data record comprising:

a data record processor having an aperture in a face thereof for receiving the data record therethrough for positioning of the data record at least partially within the data record processor, and a coupler for engaging or disengaging the data record when at least partially within the data record processor, the data record processor being operable to record data to or read data from the data record, the coupler including an actuation shaft configured such that rotational movement of the shaft in a first rotational direction by a first activation amount activates the coupler to engage the data record and rotational movement of the shaft in an opposite second rotational direction by a second activation amount activates the coupler to disengage the data record;

a member securely attached to the shaft for rotation of the shaft with the member, the member being operable when rotated in the first rotational direction to apply a first rotational torque to the shaft in the first rotational direction sufficient to rotatably move the shaft by the first activation amount, and when rotated in the second rotational direction to apply a second rotational torque to the shaft in the second rotational direction sufficient to rotatably move the shaft by the second activation amount, the member having first and second portions projecting away from the shaft in opposing directions;

a first push button having an inward end portion thereof securely attached to the first member portion at a location away from the shaft for movement of the inward end portion of the first push button and the first member portion together, and an engagement outward end portion positioned toward the face of the data record processor, the first push button being configured to transmit a first linear inward force applied to the engagement end portion thereof to the first member portion to thereby apply the first rotational torque to the shaft in the first rotational direction and activate the coupler to engage the data record;

a second push button having an inward end portion thereof securely attached to the second member portion at a location away from the shaft for movement of the inward end portion of the second push button and the second member portion together, and an engagement outward end portion positioned toward the face of the data record processor, the second push button being configured to transmit a second linear inward force applied to the engagement end portion thereof to the second member portion to thereby apply the second rotational torque to the shaft in the second rotational direction and activate the coupler to disengage the data record;

an accessor having a data record engagement portion selectively operable to engage the data record and move the data record through the aperture in the face of the data record processor and to engage the data record and remove the data record from the aperture in the face of the data record processor, the accessor being further selectively operable to position and move the data record engagement portion to apply the first linear inward force to the engagement end portion of the first push button and to apply the second linear inward force to the engagement end portion of the second push button; and an actuator configured to selectively move the accessor relative to the data record processor.

2. The apparatus of claim 1, wherein the member is a crank coupled to the shaft of the coupler.

3. The apparatus of claim 1, wherein the member further includes:

a rotatable transfer shaft having a first end and a second end, the first end coupled to the shaft of the coupler; and the member is securely coupled to the second end of the transfer shaft and operable to rotate the transfer shaft.

4. The apparatus of claim 1, wherein the member comprises:

a rotatable crank coupled to the shaft of the coupler; and the first and second push buttons are pivotally secured to the first and second member portions of the crank and operable to rotate the crank about an axis of rotation of the shaft of the coupler.

5. The apparatus of claim 1, further including:

a housing attached to the data record processor, the housing having first and second apertures; and the first and second push buttons extend outward through the first and second apertures with the engagement outward end portions of the first and second push buttons outward of the housing and supporting the first and second buttons in the first and second apertures as the first and second linear inward forces are applied thereto to rotatably move the shaft of the coupler about an axis of rotation of the shaft of the coupler.

6. The apparatus of claim 1, wherein the accessor further comprises a gripper element configured for gripping the data record.

7. The apparatus of claim 1, wherein the data engagement portion of the accessor is a gripper configured for gripping the data record.

8. The apparatus of claim 1, further including a storage library to hold the data records while not engaged by the data record processor, the accessor being arranged to transport the data records when not engaged by the data record processor to the storage library for storage therein.

9. The apparatus of claim 1 wherein the engagement outward end portions of the first and second push buttons are positioned outward of the face of the data record processor.

10. The apparatus of claim 1 wherein the inward end portion of the first and second push buttons are pivotally attached to the first and second member portions, respectively, of the member.

11. The apparatus of claim 1 further including a housing attached to the data record processor and rotatably supporting the member at a side thereof away from the shaft of the coupler.

12. An apparatus for loading and unloading a data record comprising:

a data record processor having a forward portion thereof configured to receive the data record and a coupler configured to selectively engage and disengage the data record, the data record processor being operable to record data to or read data from the data record, the coupler including an actuation shaft configured such that rotational movement of the shaft in a first rotational direction by a first activation amount activates the coupler to engage the data record and rotational movement of the shaft in an opposite second rotational direction by a second activation amount activates the coupler to disengage the data record;

a rotatable member attached to the shaft for rotation of the shaft with the rotatable member, the rotatable member being operable when rotated in the first rotational direction to apply a first rotational torque to the shaft in the first rotational direction sufficient to rotatably move the shaft by the first activation amount, and when rotated in the second rotational direction to apply a second rotational torque to the shaft in the second rotational direction sufficient to rotatably move the shaft by the second activation amount, the rotatable member having first and second portions projecting away from the shaft in different directions;

a first push member having an inward end portion thereof attached to the first rotatable member portion so as to move together, the inward end portion of the first push member being attached to the first rotatable member portion at a location away from the shaft, the first push member further having an engagement outward end portion positioned toward the forward portion of the data record processor, the first push member being configured to transmit a first linear inward force applied to the engagement end portion thereof to the first rotatable member portion to thereby apply the first rotational torque to the shaft in the first rotational direction and activate the coupler to engage the data record;

a second push member having an inward end portion thereof attached to the second rotatable member portion so as to move together, the inward end portion of the second push member being attached to the second rotatable member portion at a location away from the shaft, the second push member further having an engagement outward end portion positioned toward the forward portion of the data record processor, the second push member being configured to transmit a second linear inward force applied to the engagement end portion thereof to the second rotatable member portion to thereby apply the second rotational torque to the shaft in the second rotational direction and activate the coupler to disengage the data record;

an accessor having a data record engagement portion selectively operable to engage and move the data record toward the data record processor and to engage and remove the data record from the data record processor, the accessor being further selectively operable to apply the first linear inward force to the engagement end portion of the first push member and to apply the second linear inward force to the engagement end portion of the second push member; and an actuator configured to selectively move the accessor relative to the data record processor.

13. The apparatus of claim 12 wherein the engagement outward end portions of the first and second push members are positioned outward of the forward portion of the data record processor.

14. The apparatus of claim 12 wherein the inward end portion of the first and second push members are pivotally attached to the first and second member portions, respectively, of the member.

15. The apparatus of claim 12 further including a housing attached to the data record processor and rotatably supporting the member at a side thereof away from the shaft of the coupler.

16. The apparatus of claim 12 further including a housing supporting the engagement outward end portions of the first and second push members as the first and second push members move inward in response to the first and second linear inward forces applied to the respective engagement end portions thereof.

17. The apparatus of claim 12 wherein the data engagement portion of the accessor is a gripper configured to selectively grip the data record, and moveable to selectively apply the first and second linear inward forces to the engagement end portions of the first and second push members, respectively.

18. A method for loading and unloading a data record into and from a data record processor having an aperture in a forward portion thereof configured to receive the data record and a coupler configured to selectively engage and disengage the data record, the data record processor being operable to record data to or read data from the data record, the coupler including an actuation shaft configured such that rotational movement of the shaft in a first rotational direction by a first activation amount activates the coupler to engage the data record and rotational movement of the shaft in an opposite second rotational direction by a second activation amount activates the coupler to disengage the data record, comprising:

first, using an accessor having a data record engagement portion selectively operable to engage and move the data record to insert the data record into the aperture in the forward portion of the data record processor;

second, rotating in the first rotational direction a rotatable member attached to the shaft for rotation of the shaft with the rotatable member to apply a first rotational torque to the shaft in the first rotational direction sufficient to rotatably move the shaft by the first activation amount to activate the coupler to engage the data record, the rotation of the rotatable member in the first rotational direction being accomplished by engaging and pushing on an engagement outward end portion of a first push member positioned toward the forward portion of the data record processor to move an inward end portion thereof attached to a first portion of the rotatable member projecting away from the shaft at a location away from the shaft, the inward end portion of the first push member and the first rotatable member portion being attached so as to move together, the first push member being configured to transmit a first linear inward force applied to the engagement end portion thereof to the first rotatable member portion to thereby apply the first rotational torque to the shaft in the first rotational direction and activate the coupler to engage the data record;

third, recording data to or reading data from the data record;

fourth, rotating in the second rotational direction the rotatable member to apply a second rotational torque to the shaft in the second rotational direction sufficient to rotatably move the shaft by the second activation amount to activate the coupler to disengage the data record, the rotation of the rotatable member in the second rotational direction being accomplished by engaging and pushing on an engagement outward end portion of a second push member positioned toward the forward portion of the data record processor to move an inward end portion thereof attached to a second portion of the rotatable member projecting away from the shaft in a direction different from the first rotatable member portion at a location away from the shaft, the inward end portion of the second push member and the second rotatable member portion being attached so as to move together, the second push member being configured to transmit a second linear inward force applied to the engagement end portion thereof to the second rotatable member portion to thereby apply the second rotational torque to the shaft in the second rotational direction and activate the coupler to disengage the data record; and fifth, using the accessor to remove the data record from the aperture in the forward portion of the data record processor.

19. The method of claim 18 wherein the rotation of the rotatable member in the first and second rotational directions is accomplished by using the data record engagement portion of the accessor to selectively engage and push inward on the engagement outward end portions of the first and second push members, respectively.

20. The method of claim 18, further comprising the step of transporting the data record from or to a storage rack.

* * * * *